3,783,118
METHOD FOR THE ELECTROPHORETIC SEPARATION OF SUBSTANCE MIXTURES
Vilhelm Einar Stellan Hjertén, Uppsala, Sweden, assignor to Pharmacia Fine Chemicals AB, Uppsala, Sweden
No Drawing. Filed Dec. 4, 1972, Ser. No. 312,243
Claims priority, application Sweden, Dec. 13, 1971, 15,933/71
Int. Cl. B01k 5/00
U.S. Cl. 204—180 G                                          1 Claim

ABSTRACT OF THE DISCLOSURE

The present invention relates to a method for the separation of substances in a mixture and more particularly, it is concerned with a method for the separation of substances in a mixture, in which the mixture is caused to pass through a gel body under the influence of an electric force field to divide the constituents of the mixture into different zones within the gel body, whereafter the gel body is divided into pieces, each containing one of said zones, and the piece or pieces of gel are solubilized by decomposition and caused to form a solution together with one or more separated constituents.

---

Such a method is known to the art. Thus, it is known to divide the gel body into small pieces, which are treated to recover the substance or substances present therein separately. The method conventionally used for recovering the substance or substances involves leaching the same after mechanical disintegration of each gel piece. This method is encumbered with a number of disadvantages, the main disadvantage being that the substance is strongly diluted in the leaching process. Further, it is not possible to leach out all of the substance, causing losses of valuable material. In addition, pieces of the material present in gel form are also liable to be leached out during the leaching process. For example, when leaching out polyarylamide gels, soluble, high molecular weight polymers are liable to be leached out together with a separated substance, thereby creating a new, difficultly solved separating problem. Further, the time taken to effect a leaching process is quite considerable and may extend to several days.

It has been discovered that these disadvantages can be eliminated or considerably reduced by passing the piece or pieces of gel material obtained when disintegrating the body as mentioned above into solution. If so desired, the obtained solution of the solubilized gel material can then be subjected to any suitable form of separating technique, for the purpose of recovering the desired substance or optionally substances obtained during the separating process effected under the influence of the electric force field.

The present invention provides an improvement of the above described process. According to this improvement, the gel material is solubilized by decomposition under the influence of a specific enzyme. If the gel substance is in the form of a water-insoluble polymer of dextran and epichlorohydrine, it can be solubilized by allowing dextranase to act on the polymer, thereby causing the polymer to be broken down to smaller molecules capable of being dissolved in water and which form a solution together with the previously separated substance. The desired substance can be readily separated from the solution by gel filtration for example. Other examples of gel material which can be used according to the invention are agar, agarose, cellulose, cellulose derivatives, starch and pectin. These can be broken down to a form in which they are soluble in water by means of agarase, cellulase, amylase and pectinase, respectively.

A particularly important application of the present invention is with the so-called electrophoretic separation of substances in mixtures, in which charged substances such as proteins and nucleic acids are involved.

The present invention offers a simple solution to the problem of recovering an individual substance from the body of gel substances used in the separation process. Subsequent to dividing the body into pieces or lumps of smaller size, each containing a separate substance, the gel material is solubilized by the aid of a specific enzyme and thus passes into solution together with the separated substance, from which solution the substance can be separated, if so desired, often by simple gel filtration or dialysis for example.

The invention will now be illustrated by means of a number of examples.

EXAMPLE 2

A water-swollen gel of cross-linked dextran having a water content of about 17 ml./g. dry substance was formed into a plate 0.5 x 10 x 10 cm. size. The gel plate was washed for some days in a buffer solution comprising 0.1 M tris-HCl having a pH=8.0. The gel equilibrated with the buffer was then fully swollen.

The swollen gel plate having the aforementioned dimensions was then placed between two glass plates, which were taped at two opposing sides. The gel body enclosed between the glass plates was then inserted in an electrophoresis apparatus for gel plates. Sample application wells were cast in the upper end of the gel plate and a sample of serum was applied to the wells. The separation process was then carried out at 30 v. and 40 ma. for 16 hours. The electrophoresis buffer solution comprised 0.1 M tris-HCl, pH 8.0 (the same buffer solution as that used for the washing process above). The sample solution was divided by the electrophoresis process into ten zones.

A strip of the gel plate removed parallel with the direction of migration of the zones was dyed with amidoschwarz, to show where the different substances were located. The gel body was then divided into pieces, each one containing its particular substance or substances. Each of the gel pieces was placed in a test tube and the enzyme dextranase was added. 10 μl. of a solution of dextranase, containing about 180 units/ml. were added. After incubation overnight, the gel material was found to have solubilized and to have passed into liquid form.

EXAMPLE 2

1 g. of agarose was dissolved in a barbiturate buffer solution, pH=8.6, while applying heat. The solution was cast into the form of a plate of 0.2 x 3 x 7 cm. in size.

In a manner similar to that described in Example 1, serum was separated electrophoretically in the thus prepared gel plate. In this instance, five well separated components were obtained.

The desired substances were localized and liberated in a manner similar to that described in Example 1, but with the exception that in this case the added enzyme was agarase from Flavobacterium sp. N.C.I.B. 9491. After incubation over night, the gel was found to have passed completely into solution.

What I claim is:

1. In a method for the separation of substances in a mixture, the mixture being caused to pass through a gel body under the influence of an electric force field to divide the constituents of the mixture into different zones within the gel body, whereafter the gel body is divided into pieces, each containing one such zone, and the piece or pieces of gel being solubilized by decomposition and caused to form a solution together with one or more separated constituents, the improvement which comprises solubilizing the gel piece or pieces by decomposing the same by means of an enzyme.

References Cited
UNITED STATES PATENTS

| | | | |
|---|---|---|---|
| 3,384,564 | 5/1968 | Ornstein et al. | 204—299 |
| 3,445,360 | 5/1969 | Via, Jr. | 204—180 G |
| 3,576,727 | 4/1971 | Evatt | 204—180 G |
| 3,657,260 | 4/1972 | McLeester | 204—299 |

JOHN H. MACK, Primary Examiner

A. C. PRESCOTT, Assistant Examiner